(12) United States Patent
Shapery

(10) Patent No.: US 9,776,714 B2
(45) Date of Patent: Oct. 3, 2017

(54) ENGINE SYSTEM FOR VERTICAL AND SHORT TAKE OFF AND LANDING (V/STOL) AIRCRAFT

(71) Applicant: Sandor Wayne Shapery, San Diego, CA (US)

(72) Inventor: Sandor Wayne Shapery, San Diego, CA (US)

(73) Assignee: Sandor Wayne Shapery, San Diego, CA (US)

( * ) Notice: Subject to any disclaimer, the term of this patent is extended or adjusted under 35 U.S.C. 154(b) by 191 days.

(21) Appl. No.: 14/514,219

(22) Filed: Oct. 14, 2014

(65) Prior Publication Data

US 2016/0229532 A1 Aug. 11, 2016

Related U.S. Application Data

(60) Provisional application No. 61/891,120, filed on Oct. 15, 2013.

(51) Int. Cl.
| | |
|---|---|
| *B64D 27/00* | (2006.01) |
| *B64C 29/00* | (2006.01) |
| *B64C 11/00* | (2006.01) |
| *B64D 27/02* | (2006.01) |

(52) U.S. Cl.
CPC ........ *B64C 29/0075* (2013.01); *B64C 11/001* (2013.01); *B64D 2027/026* (2013.01); *Y02T 50/64* (2013.01)

(58) Field of Classification Search
None
See application file for complete search history.

(56) References Cited

U.S. PATENT DOCUMENTS

| | | | | |
|---|---|---|---|---|
| 3,302,404 A | * | 2/1967 | Gist, Jr. | ................ B64C 25/423 239/265.19 |
| 3,312,424 A | * | 4/1967 | Kappus | ............... B64C 29/0016 244/12.5 |
| 3,390,852 A | * | 7/1968 | Miller | ................... B64C 31/032 244/45 R |
| 3,820,746 A | * | 6/1974 | Vedova | ............... B64C 29/0016 244/12.3 |

(Continued)

*Primary Examiner* — Medhat Badawi
(74) *Attorney, Agent, or Firm* — Knobbe Martens Olson & Bear LLP

(57) ABSTRACT

An engine system with a multi-gas-generator, tip-turbine driven lift fan with pressurized air circulation control for use on vertical and short-take-off and landing (V/STOL) aircraft is disclosed. Gas generators located around the periphery of the fan drive the fan through action on a fan blade-tip turbine or provide compressed gas (hot or cold) to circulation control devices. Variable pitch fan blades improve part-power cruise performance. Enclosed in a nacelle, the engine employs circulation control to enhance V/STOL performance. In some embodiments, a core cruise turbine gas generator mounted in the center of the fan duct powers the fan during cruise mode. In some hybrid gas and electric power embodiments, the core cruise gas generator is replaced by an electric motor that draws power from a battery in the fuselage. The battery may be charged by an electric generator driven by a gas generator around the periphery of the fan.

18 Claims, 12 Drawing Sheets

(56) References Cited

U.S. PATENT DOCUMENTS

| | | | |
|---|---|---|---|
| 3,972,490 A * | 8/1976 | Zimmermann | F02C 3/073 244/12.3 |
| 4,022,405 A * | 5/1977 | Peterson | B64C 29/0025 244/12.3 |
| 4,116,405 A * | 9/1978 | Bacchi | B64C 39/12 244/12.4 |
| 4,296,896 A * | 10/1981 | Kress | B64C 29/0075 244/12.4 |
| 4,469,294 A * | 9/1984 | Clifton | B64C 29/0025 244/10 |
| 4,828,203 A * | 5/1989 | Clifton | B64C 29/0033 244/12.3 |
| 4,880,071 A * | 11/1989 | Tracy | B64C 29/0033 180/117 |
| 4,898,343 A * | 2/1990 | Kamo | B64C 29/0075 244/12.4 |
| 5,054,716 A * | 10/1991 | Wilson | B64D 35/00 244/56 |
| 5,115,996 A * | 5/1992 | Moller | B64C 29/0025 239/265.19 |
| 5,275,356 A * | 1/1994 | Bollinger | B64C 29/0016 244/12.3 |
| 5,507,453 A * | 4/1996 | Shapery | B64C 29/0025 244/12.2 |
| 6,270,037 B1 * | 8/2001 | Freese | B64C 29/0025 244/12.3 |
| 6,607,161 B1 * | 8/2003 | Krysinski | B64C 9/00 244/56 |
| 6,629,670 B1 * | 10/2003 | Shah | B64C 29/0058 244/12.3 |
| 6,655,631 B2 * | 12/2003 | Austen-Brown | B64C 27/28 244/12.4 |
| 6,843,447 B2 * | 1/2005 | Morgan | B64C 29/0025 244/12.3 |
| 6,886,776 B2 * | 5/2005 | Wagner | B64C 3/56 244/12.1 |
| 7,410,122 B2 * | 8/2008 | Robbins | B64C 39/068 244/12.3 |
| 7,857,253 B2 * | 12/2010 | Yoeli | B64C 1/1415 244/12.3 |
| 2001/0011691 A1 * | 8/2001 | Provost | B64C 11/001 244/55 |
| 2002/0189230 A1 * | 12/2002 | Franchet | F02K 3/025 60/204 |
| 2003/0080242 A1 * | 5/2003 | Kawai | B64C 11/001 244/12.4 |
| 2003/0106959 A1 * | 6/2003 | Fukuyama | B64C 27/20 244/23 R |
| 2004/0026563 A1 * | 2/2004 | Moller | B64C 3/56 244/12.4 |
| 2005/0133662 A1 * | 6/2005 | Magre | B64C 29/0033 244/7 R |
| 2006/0016930 A1 * | 1/2006 | Pak | A63H 27/14 244/12.4 |
| 2009/0145998 A1 * | 6/2009 | Salyer | B64C 27/04 244/17.23 |
| 2009/0229243 A1 * | 9/2009 | Guemmer | B64D 27/12 60/226.1 |
| 2014/0117152 A1 * | 5/2014 | Suciu | F02K 3/06 244/54 |
| 2014/0183296 A1 * | 7/2014 | Suciu | F02K 3/06 244/54 |
| 2014/0346283 A1 * | 11/2014 | Salyer | B64C 37/00 244/7 A |
| 2016/0010589 A1 * | 1/2016 | Rolt | F02K 3/065 60/226.1 |
| 2016/0229532 A1 * | 8/2016 | Shapery | B64C 29/0075 |

* cited by examiner

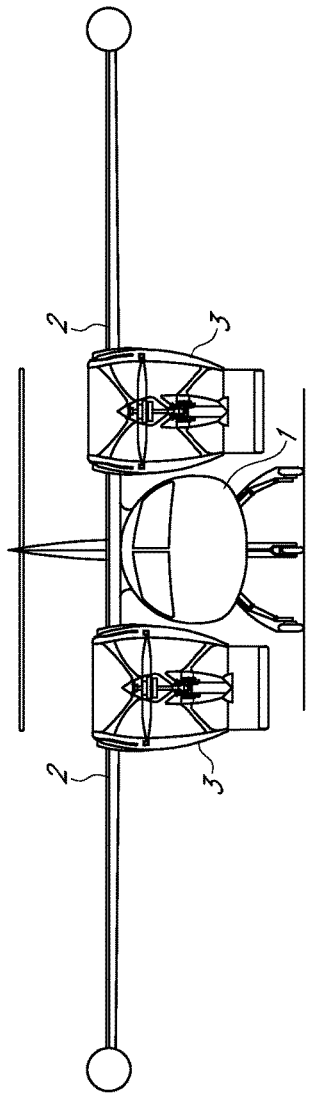
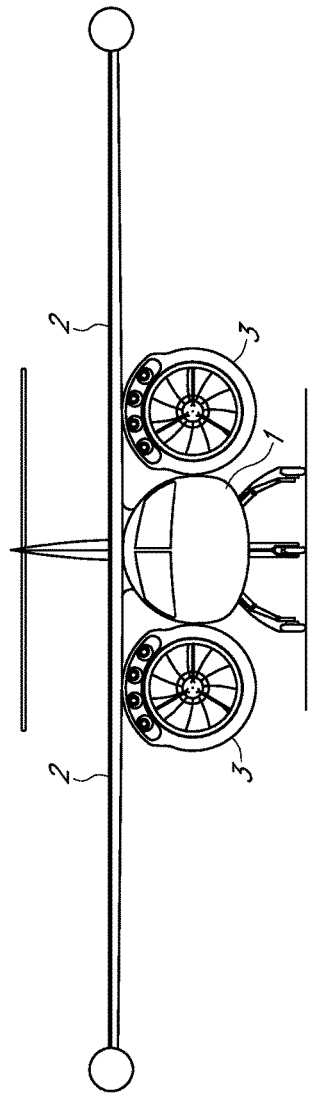
FIG. 3A
FIG. 3B

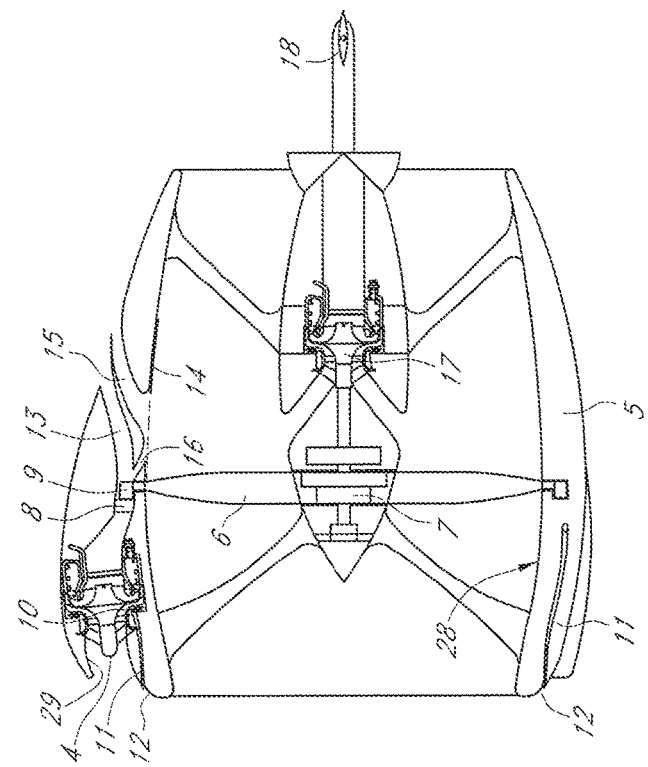
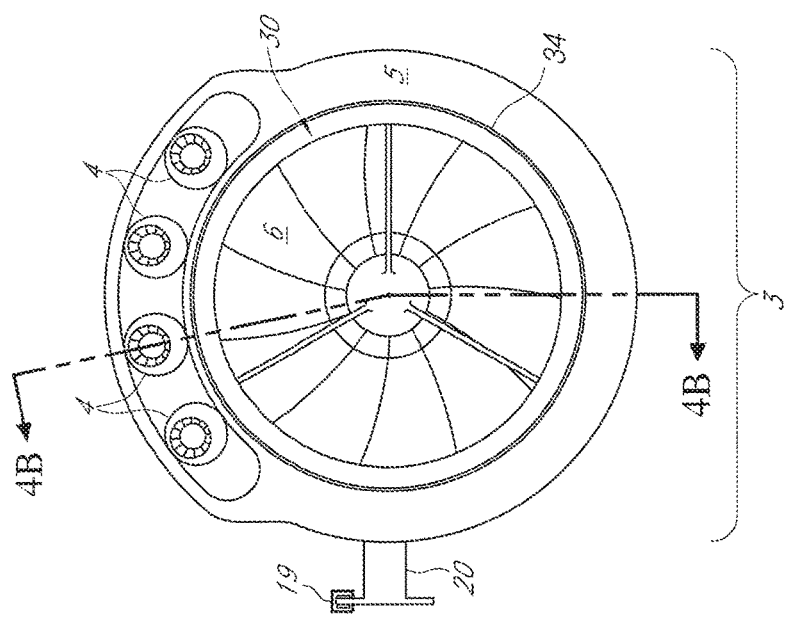
FIG. 4B
FIG. 4A

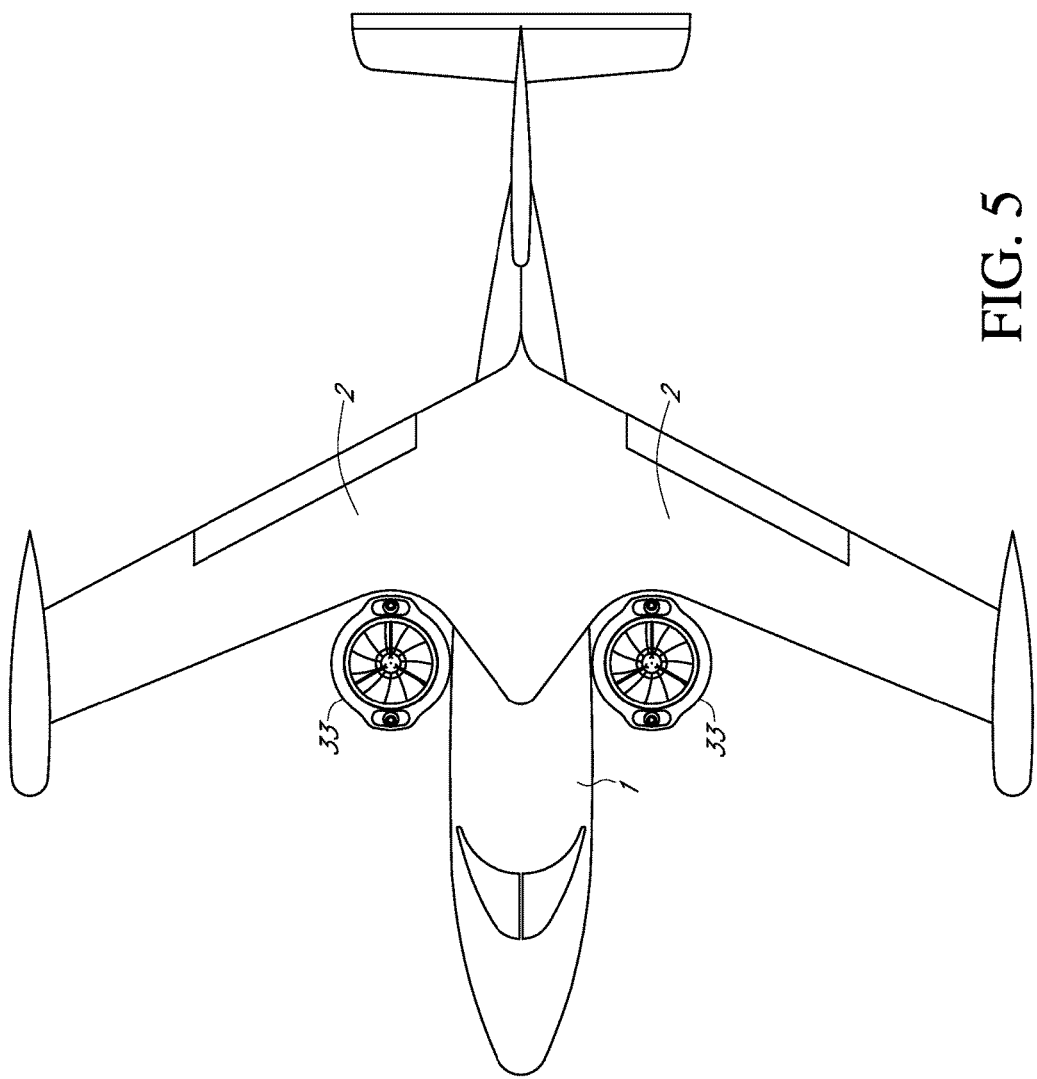

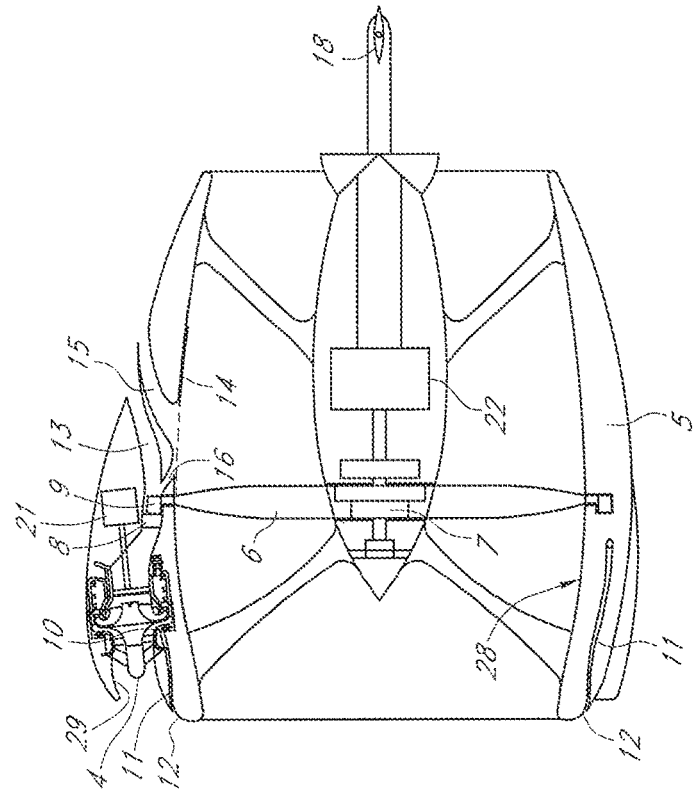
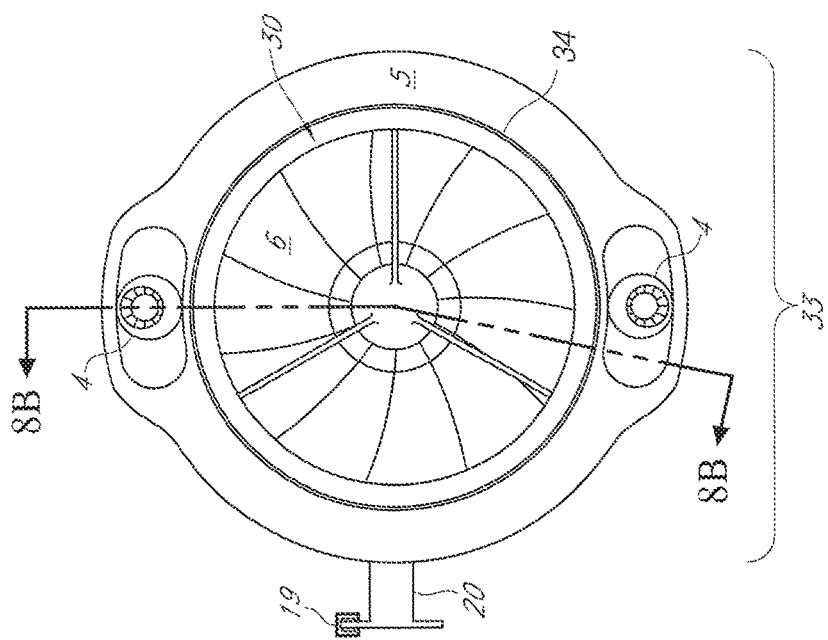
FIG. 8B
FIG. 8A

ENGINE SYSTEM FOR VERTICAL AND SHORT TAKE OFF AND LANDING (V/STOL) AIRCRAFT

CROSS-REFERENCE TO RELATED APPLICATIONS

This application claims priority to and the benefit under 35 U.S.C. 119(e) of U.S. Provisional Patent Application No. 61/891,120 entitled "ENGINE SYSTEM FOR VERTICAL AND SHORT TAKE OFF AND LANDING (V/STOL) AIRCRAFT" filed Oct. 15, 2013, the disclosure of which is hereby incorporated by reference in its entirety.

FIELD

The invention relates to gas-turbine and hybrid (gas and electric) power plants for vertical takeoff and landing (VTOL) and vertical short takeoff and landing (V/STOL) aircraft.

BACKGROUND

VTOL and V/STOL aircraft take off vertically, fly horizontally, and land either vertically or horizontally. Hardware cost (both procurement and maintenance) has been traditionally high due to the complexity of the lifting system, safety systems, conversion system and need for redundancy. Undesirable propulsive cruise efficiency often results from performance compromises made to ensure sufficient lift thrust and minimal damage to airport surfaces. It also results from additional weight of redundant systems and oversized engines. This lower cruise efficiency often yields a range that is not sufficiently better than that of helicopters. In order for VTOL fixed wing aircraft to be commercially viable, there is a need for engines that enable safe and efficient vertical takeoff, sustain horizontal flight, land safely with one or more engines out, operate quietly in metropolitan areas, meet emissions requirements, and minimize erosion of landing and take-off surfaces.

SUMMARY OF THE INVENTION

A summary of sample aspects of the disclosure follows. For convenience, one or more aspects of the disclosure may be referred to herein simply as "some aspects."

Methods and apparatuses or devices being disclosed herein each have several aspects, no single one of which is solely responsible for its desirable attributes. Without limiting the scope of this disclosure, for example, as expressed by the claims which follow, its more prominent features will now be discussed briefly. After considering this discussion, and particularly after reading the section entitled "Detailed Description" one will understand how the features being described provide advantages of certain embodiments.

One aspect of the disclosed technology provides an engine system for vertical takeoff and landing (VTOL) aircraft. The engine system includes a fan comprising a plurality of blades. The engine system includes at least one gas generator disposed relative to the plurality of blades so that exhaust gas from the at least one gas generator impinge on the plurality of blades to generate rotational energy.

Another aspect of the disclosed technology provides a method for operating a vertical takeoff and landing (VTOL) aircraft. The method includes providing a nacelle comprising at least one gas generator and a fan, the fan including a plurality of blades. The method includes exhausting gas from the at least one gas generator. The method includes directing the exhausted gas to impinge on the plurality of blades so as to generate rotational energy for the fan. The method includes rotating the nacelle between a vertical mode and a horizontal mode during flight.

Another aspect of the disclosed technology provides an engine system for vertical takeoff and landing (VTOL) aircraft. The engine system includes a fan configured to be disposed in a nacelle and rotatable about a shaft, the fan comprising a plurality of blades. The engine system includes a first gas generator disposed forward of the fan so that exhaust gas from the first gas generator overlaps the plurality of blades.

BRIEF DESCRIPTION OF THE DRAWINGS

FIG. 3A illustrates an exemplary vertical mode front view of the VTOL fixed wing aircraft from FIG. 1.

FIG. 3B illustrates an exemplary horizontal mode front view of the VTOL fixed wing aircraft from FIG. 1.

FIG. 4A illustrates an exemplary front view of an engine assembly from FIG. 1.

FIG. 4B illustrates an exemplary section view of the engine assembly from FIG. 4A.

FIG. 5 illustrates an exemplary top view of a hybrid VTOL fixed wing aircraft.

FIG. 8A illustrates an exemplary front view of an engine assembly of the hybrid VTOL fixed wing aircraft from FIG. 5.

FIG. 8B illustrates an exemplary section view of the engine assembly from FIG. 8A.

DETAILED DESCRIPTION OF CERTAIN EMBODIMENTS

Figure 1:
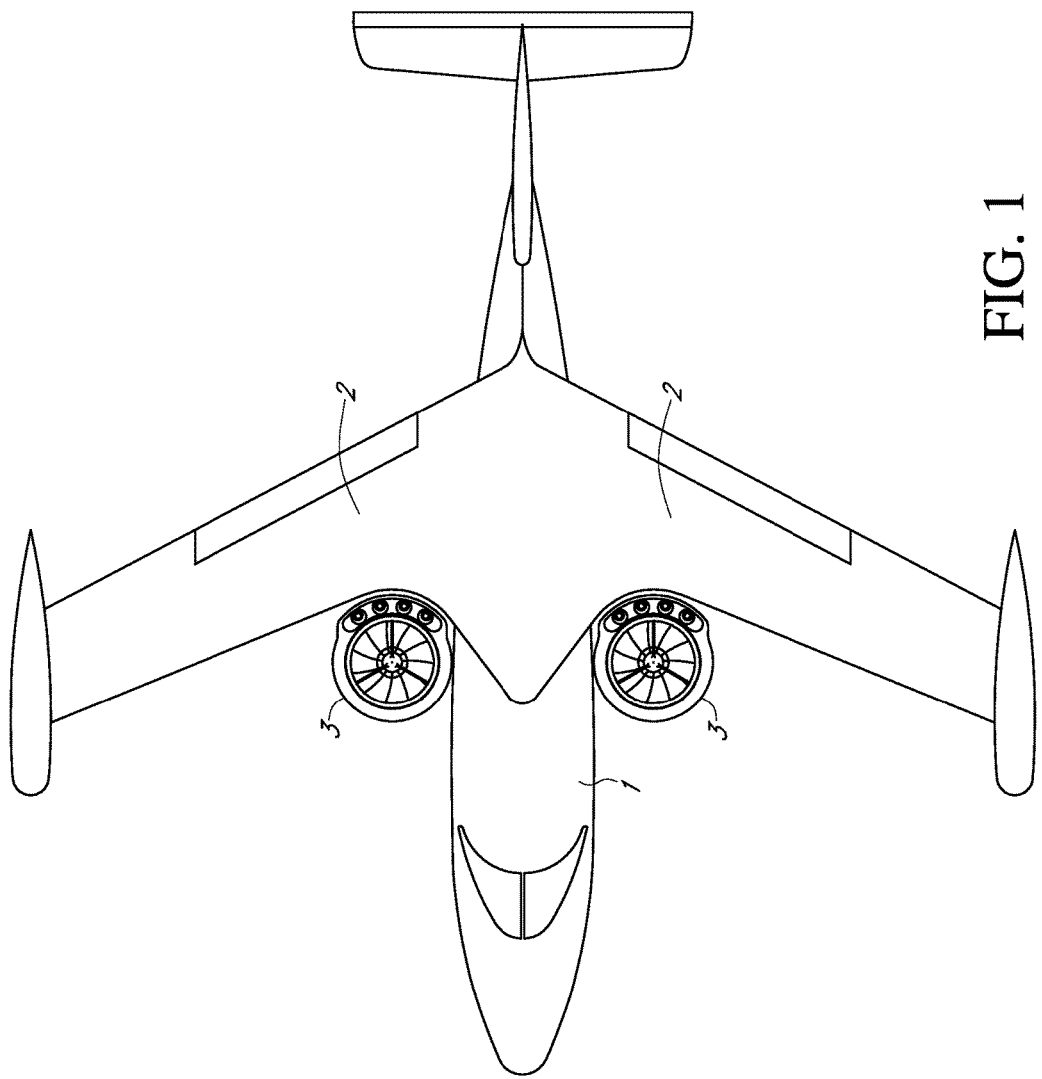
FIG. 1 illustrates an exemplary top view of a V/STOL fixed wing aircraft.

The following detailed description is directed to certain specific embodiments of the invention. However, the invention can be embodied in a multitude of different ways. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

In one embodiment, the invention provides a multi-gas-generator, tip-turbine driven lift fan (ducted fan) with pressurized air circulation control for use on vertical take-off and landing (VTOL) aircraft. In this application, VTOL aircraft includes vertical and short-take-off and landing (V/STOL) aircraft. In certain embodiments, gas generators are located directly around the periphery of the fan in the nacelle. Gas generators may drive the fan through action on a fan blade-tip turbine or could be used to provide compressed gas (hot or cold) to circulation control devices. In certain embodiments, a gas turbine engine is mounted in the center of the fan duct connected to the lift fan by a conventional shaft drive and transmission. Variable pitch fan blades may be employed to improve part-power cruise performance or vertical takeoff and the engine can be enclosed in a nacelle, which employs circulation control to enhance VTOL performance and thrust vectoring control. The multi-gas-generator fan (MGGF) may increase safety through gas generator redundancy, improve thrust to weight, reduce hover-engine-out sizing penalty, lower emissions, improve scalability and lower cost. The variable pitch fan blades provide high-response roll and collective control and improve performance matching between hover and cruise. Circulation control devices on the nacelle offer the ability to develop a fan better designed for high speed cruise while preventing stall when operated in a vertical takeoff mode, better matching of the fan for cruise performance and potentially, thrust vectoring control. Certain embodiments feature improved safety and controllability during hover and transition with high cruise efficiency. This technology development may enable quiet, cost effective, commercial, personal and military VTOL aircraft for point to point transportation.

One advantage of certain embodiments is improved low-speed and hover safety at no weight penalty due to the redundancy of several gas generators on each engine assembly. A gas generator can fail at near zero altitude and airspeed and not cause the aircraft to crash. An additional advantage derives from the greater inertia of the tip turbine mass distribution on the rim, which increases rotational inertia, which in turn, increases spool-down time in the event of a loss of turbine torque. The cross-shafting system required for roll balance at the engine-out condition is eliminated since the gas generators driving the fan are redundant.

Another advantage of certain embodiments is efficient operation over a wider power range than could be had with a conventional gas turbine with single core. By definition, a VTOL needs a turndown ratio at least equal to the L/D of the aircraft, which can be as high as 20 to 1 on very efficient aircraft. By shutting off gas generators as the engines are throttled back for cruise, the cruise engine and remaining gas generators can be kept at full design power and therefore at best cycle efficiency for efficient cruise.

Another advantage of certain embodiments is the ability to operate in the "emissions bucket" over a wider overall turndown ratio. This is because each gas generator has very little turndown ratio and is always operating very close to the optimum design turbine inlet temperature for best emissions.

Another advantage of certain embodiments is the availability of high-pressure bleed at very low power levels. This can be an advantage during approach for landing when engines are at flight idle and the aircraft still requires high-pressure air for operation of airframe or engine devices including boundary layer circulation control devices that utilize air jets.

Another advantage of certain embodiments is reduction in power required for starting. The aircraft battery need only have the capacity to start a single gas generator which, in turn, can be used to start the remainder of gas generators. The gas generator would be roughly ⅛th the size of a single-core engine gas generator spool.

Another advantage of certain embodiments is more robust bird-ingestion resistance. Configuration of the engine is such that a bird entering the fan will not enter a gas generator. With gas generators capable of full power, the FAA minimum power requirement could still easily be met. Conversely, a bird entering one or more of the gas generators will not likely enter the fan. Fan performance will not be compromised other than a slight reduction in power if a bird enters more than one gas generator. Gas generator inlets can be individual holes spaced such that a bird would likely only enter a single gas generator.

Another advantage of certain embodiments is better efficiency over previous tip-turbine driven fan designs due to closer proximity of the gas-generator exit to the fan tip turbine. Complex, heavy and expensive ducting and manifolding systems are eliminated.

Another advantage of certain embodiments is simplified engine repair and maintenance. By virtue of their size and accessibility, gas generators could be removed and replaced as line-replaceable units (LRUs) by a single person in the field. The pilot could rotate through gas generators (GGs) in cruise potentially having a four-fold increase in tibe between overhaul (TBO) of the complete system if TBO is tied to hot section time at temperature. The GGs will be much easier to remove and replace than the core of a conventional engine. New or rebuilt gas generators could be stocked as LRUs.

In one embodiment, the invention comprises a fan 30 driven by an array of small gas generators 4 or gasifiers that are located around the periphery of the fan 30, and drives the fan by acting on blades 6 or buckets that are fixed to the fan blade 6 tips. The gas generators 4 are located close to the fan blade 6 tips and are sufficient in number that one could completely fail without affecting flight safety. With sufficient redundancy, failure of a single gas generator 4 may be largely transparent to the pilot. With close coupling to the turbine blades 6, the gases exiting the gas generators 4 could be directed through a substantially constant-diameter gas generator duct 29 such that full momentum is maintained. (i.e., there would be little or no diffusion or increase in static pressure.) Thus, in the case where a gas generator 4 fails, gases from adjacent gas generators 4 would not be induced to travel backwards through the failed gas generator 4. Smaller size of the gas generators 4 could significantly reduce their cost and minimize any difference in cost between the collection and a single gas generator of equivalent total power. For greater operating efficiency a multi-stage core cruise turbine 17 can be installed in the center of the fan connected to the fan 30 by a conventional shaft and gearbox and utilized for cruise.

In an embodiment, the gas generators 4 may be arranged to be adjacent to each other to minimize partial admission losses in the tip turbine. The inlets of the gas generators 4 may be separate such that, in the event of a bird strike, the bird would likely only enter one of the gas generators 4. A bird entering the fan 30 would likely not enter any of the gas generators 4.

In an embodiment, one advantage of this arrangement is the ability to throttle the engine 3 throughout a turndown ratio commensurate with VTOL operation without incurring a significant efficiency penalty. The disclosed technology may enable aircraft with lift over drag (L/D) ratios exceeding 12 or 15. In this instance, the engines would collectively be capable of generating full lift equal to the aircraft takeoff weight plus margin, and then be able to be throttled back to $\frac{1}{15}$th this value for cruise. Gas generators 4 may be selectively shut down as the aircraft approaches cruise leaving as few as one per fan operational at cruise or the more efficient core cruise turbine 17 can be utilized. This core cruise turbine 17 could be operating at high power and therefore, at best efficiency. Because gas generators would not be operating outside of a narrow power band, exhaust emissions could be minimized.

In an embodiment, the gas generators 4 may be located beneath a nacelle panel and would be easily accessible. Their size and ready accessibility could enable their removal and replacement by a single person in the field using simple tools. A spare gas generator 4 could even be kept on board the aircraft.

The multi-gas generator concept addresses part-power fuel consumption due to high turndown ratio, and safety if an engine fails (engine-out).

Leading Edge Circulation Control

Leading edge circulation control addresses matching a nacelle inlet 12 for both lift and cruise operation. An inlet 12 that is properly sized for hover could be oversized as much as 150% for cruise.

In an embodiment, in order to match a nacelle inlet 12 for both lift and cruise operation and improve cruise performance, the inlet 12 may be downsized from the optimum hover area and circulation control used to achieve the required diffusion between inlet throat and fan face. This may take the form of a continuous slot or row of jets around the circumference of the duct 28 outer flowpath wall that are directed in the direction of flow. The resultant energizing of the flow at the proper location in the diffusing duct may cause the flow to remain attached to the outer flowpath surface. This may enable use of a considerably shorter inlet duct 12 than would otherwise be needed without the circulation control. This circulation control would also improve fan 30 performance during transition from hover to cruise by preventing flow detachment in the inlet 12.

Fan Exit Flow Circulation Control

In an embodiment, the multi gas-generator driven fan engine 3 may also be used in concert with a circulation control jet located in the fan duct 28 just behind the fan blade 6. The circulation control jet is oriented to induce a radially outward velocity component in the fan gases upon vertical takeoff and thus would diffuse the flow and direct it out an annular duct containing an actuator door which is adjacent to the exhaust duct for the tip turbines. The resultant reduction in static pressure at the fan duct exit plane may also increase the total airflow through the fan duct and augment fan lift. This augmentation in duct flow may be assisted by the circulation control device in the fan inlet 12. The diffusion of exit flow may also serve to reduce the exhaust velocity at the ground plane thus reducing damage to runways and ramps.

Variable Pitch Fan Blades

In order to achieve the optimum lift and cruise efficiency a variable pitch mechanism may be installed on the fan blade assembly thereby allowing the fan 30 to be trimmed to the specific requirements of the system in both takeoff mode (vertical mode) and cruise mode (horizontal mode).

Fans sized and configured for vertical takeoff may be substantially different than fans designed for horizontal flight. A fan that is optimized for vertical takeoff may be large with a large inlet lip, have low disk loading in that it takes less horsepower to lift, has reduced downwash force, do less damage to the landing and takeoff surface, and create less noise. A fan that is optimized for high speed horizontal flight may be small in diameter with a small inlet lip, have high disk loading and higher air velocity, in addition, such a fan may produce greater noise levels. A fan designed at the midpoint between a fan optimized for horizontal flight and a fan optimized for vertical flight is not efficient for either mode.

Based on the lift/drag characteristics of an aircraft, it can take between $\frac{1}{8}$th and $\frac{1}{16}$th as much thrust to fly horizontally as it does to vertically lift an aircraft.

Figure 2A:
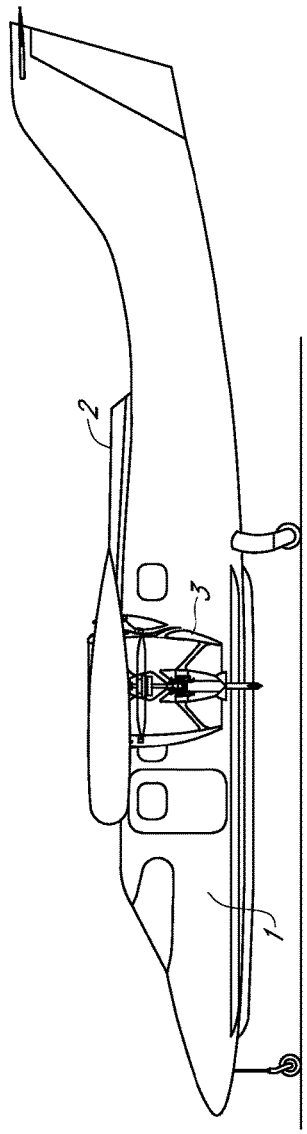
FIG. 2A illustrates an exemplary vertical mode side view of the VTOL fixed wing aircraft from FIG. 1.
Figure 2B:
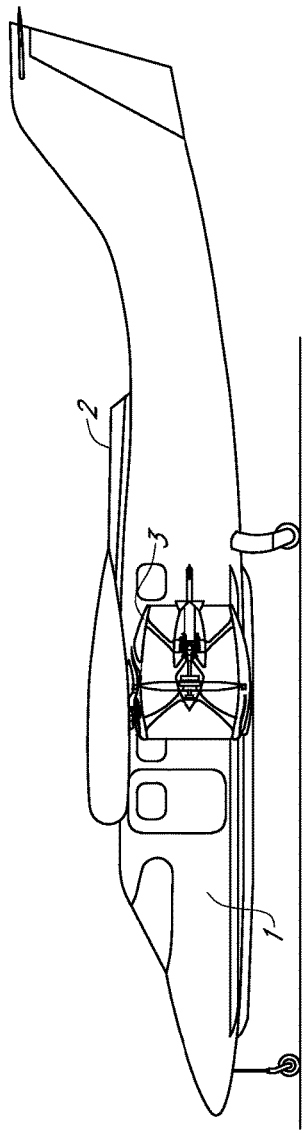
FIG. 2B illustrates an exemplary horizontal mode side view of the VTOL fixed wing aircraft from FIG. 1.

The VTOL (V/STOL) engine system and accompanying aircraft embodied herein addresses one or more of the above-described aspects. FIG. 1 illustrates an exemplary top view of a VTOL fixed wing aircraft. FIG. 2A illustrates an exemplary vertical mode side view of the VTOL fixed wing aircraft from FIG. 1. FIG. 2B illustrates an exemplary horizontal mode side view of the VTOL fixed wing aircraft from FIG. 1. FIG. 3A illustrates an exemplary vertical mode front view of the VTOL fixed wing aircraft from FIG. 1. FIG. 3B illustrates an exemplary horizontal mode front view of the VTOL fixed wing aircraft from FIG. 1. In an embodiment, the aircraft comprises a fuselage 1 of normal design and a wing 2 mounted at the top and slightly to the rear of the fuselage 1. The wing 2 may be forward swept to get it nearer to the center of gravity. The aircraft may have an engine assembly 3 that includes a fan 30 and one or more gas generators 4. The engine assembly 3 may be housed within a nacelle 5 on each side of the fuselage 1 mounted to either the fuselage 1 or to the wing 2. Each nacelle 5 may have the ability to rotate from the vertical to the horizontal depending on its flight mode. When in vertical take-off mode the engine assembly 3 may be in the upright position and may be fitted into a radiused section of the leading edge of the wing 2 next to the fuselage 1 to create more lift by inducing air flow over the top of the wing 2 and fuselage 1.

FIG. 4A illustrates an exemplary front view of an engine assembly from FIG. 1. FIG. 4B illustrates an exemplary section view of the engine assembly 3 from FIG. 4A. Each engine assembly 3 may have a plurality of hot gas generator engines 4 located on the perimeter of the nacelle 5. Each fan 30 and engine assembly 3 may have a series of fan blades 6 that are connected to a variable pitch control mechanism 7. The variable pitch control may enable the fan blade 6 geometry to be adjusted to more effectively perform in the broader ranges required by the lift and cruise mode. The blades 6 may be driven by ducting all or a portion of the exhaust gases from the gas generator engines 4 through scrolls 8 at the tips of the blades 6 or into buckets 9 attached thereto. Each engine assembly 33 has a fan duct 28, as well as a gas generator duct 29 for each gas generator 4.

In an embodiment, the exhaust gases and/or compressor air from one or more of the plurality of gas generators 4 may be controlled by diverter valves 10 and partially diverted through bypass-manifolds 11 to the leading edge blowing slot 34 of inlet 12. Exhaust gas or compressor air diverter valves 10 may control the amount of exhaust gas and or compressor air that flows through the leading edge blowing slot 34 of inlet 12. Diverted exhaust gases and or compressor air may be blown toward the center of the fan duct 28 creating the ability to advantageously modify the flow characteristics of the fan 30. In this way a duct designed for efficient cruise may be utilized for efficient lifting without the usual stall occurring at static conditions. The exhaust ducting 13 may be molded out of ceramic/titanium composite material.

In an embodiment, a port door 14 is located in the duct below the fan blades 6 which may slide forward or back thereby exposing the fan flow diverter port 15. When exhaust gases are blown through the coanda slot 16 behind the scrolls 8 and the port door 14 is in the full open position, fan flow may be partially diverted out the fan flow diverter port 15 thereby reducing ground plane pressure and augmenting fan mass flow. In cruise mode the port door 14 may be closed with the perimeter gas generators 4 turned off utilizing only core cruise turbine 17. The perimeter gas generators 4 may also be used to create greater fan thrust for maximum cruise speed when used in conjunction with the core cruise turbine 17.

In an embodiment, behind each nacelle 5 may be an exterior variable control vane 18 parallel to the ground plane located behind and across the middle of the circumference of the nacelle 5 connected to the nacelle 5 so as to create a control moment utilizing fan flow. In vertical takeoff mode the exterior variable control vane 18 may also be used for pitch and yaw control while in vertical flight. Roll control results from varying the variable pitch differential between the engine systems 3. Another embodiment may include the use of the leading edge blowing slot 34 of inlet 12 for thrust vectoring instead of using the exterior variable control vane 18.

In an embodiment, the nacelles 5 may be rotated for vertical or horizontal takeoff by means of mechanical drive and/or as a result of a clutching or braking system 19 on the rotating duct shaft 20, using engine thrust and vane deflection to change the relative angle of the nacelle 5.

In an embodiment, as the mass and weight of a gas generator 4 decreases, its thrust decreases at a lower rate. While the weight of a gas generator 4 is reduced by its cube, its thrust is reduced by approximately its square. Efficiencies are created by the use of a plurality of gas generators 4 at the perimeter of the fan duct 28 or between multiple ducts of sufficiently small enough size to fit into the gas generator duct 29 and low enough in number to keep the power system at a low weight and cost. The plurality of gas generators 4 allows a gas generator 4 to fail without jeopardizing the safety of the aircraft. Much less energy is lost by having the gas generators 4 located at the perimeter of the fan duct 28 or ducts near the tip driven fan as compared to implementations where tip driven turbine gas generators which have the engines mounted in or on the fuselage with extensive ducting of the exhaust gases over much longer distances to the fan tips. Rotation of the ducts is more difficult to accomplish with the engines located in or on the fuselage.

In an embodiment, gas generators 4 required for vertical takeoff may be shut down for more efficient horizontal flight or may be used to supplement the core cruise turbine 17 when maximum speed is required. The plurality of gas generators 4 around each fan also allows for more efficient application of the air stream diversion slots concept, and the leading edge blowing slots 34 of inlet 12 as mentioned herein above.

In an embodiment, the fan 30 may be sized closer to what would be required for efficient horizontal flight when used for vertical takeoff with consideration being given to the use of the leading edge circulation control slots located at the top outside of the inlet 12 by using exhaust gases and/or compressor air from one or more of the plurality of gas generators engines 4 which are also being used to drive the tips or buckets 9 of the fan blades 6. Blowing air through the coanda slots 16 at the inside of the duct just behind the fan blades 6 at a higher velocity than the fan flow may increase the boundary layer at the fan flow diverter duct thereby insuring a smoother flow out of the diverter duct and allowing for an increased air flow into the fan while helping to reduce the ground plane pressure loading in the exit of the fan mainstream. This may allow the fan 30 and duct 28 to be sized smaller than would normally be required for vertical takeoff, without the attendant increased fan pressure and its accompanying detrimental effect of damaging the landing or takeoff ground surface.

In an embodiment, pressurizing the leading edge blowing slots 34 of inlet 12 has the effect of altering the pressure field within the fan duct 28 allowing a smaller lip at the front of the nacelle 5 than would normally be required for vertical takeoff. This may allow a reduction in the size of the fan blade 6 for vertical takeoff, and may allow it to be sized closer to what would be optimum for horizontal flight. In horizontal flight the variable pitch control mechanism 7 may be utilized to adjust the pitch on the fan blades 6 creating a more efficient high speed turbo-fan system.

In an embodiment, the aircraft may be fitted with load sensors (not shown) on each of the landing gear (not shown), designed to measure the relative load on the front and back of the vehicle. Prior to vertical takeoff fuel may be pumped between the forward and aft fuel tanks to adjust the loaded weight distribution to the center of gravity. In an embodiment, the fuel tanks may again be balanced prior to landing in vertical mode based upon the relative weight distribution at take-off.

FIGS. 5-8B illustrate an embodiment using hybrid electric power, for which range is increased using hybrid power. FIG. 5 illustrates an exemplary top view of a hybrid VTOL fixed wing aircraft. In an embodiment, the hybrid VTOL engine assembly 33 may use two gas generators 4 for each engine, instead of four as shown in the engine assembly 3 in FIG. 1 for an exemplary non-hybrid VTOL aircraft.

Figure 6A:
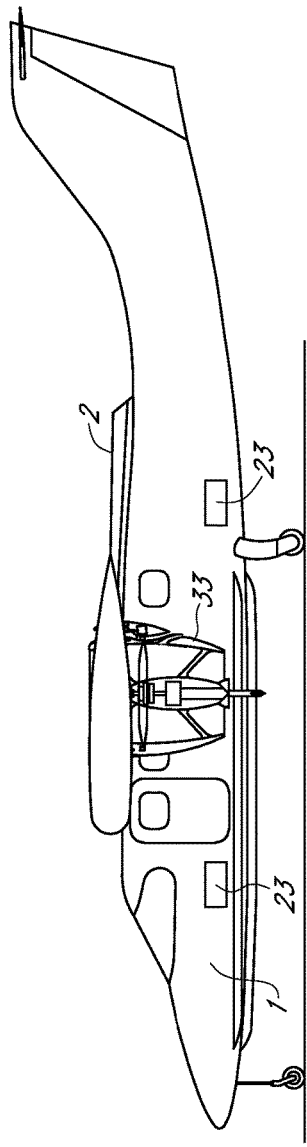
FIG. 6A illustrates an exemplary vertical mode side view of the hybrid VTOL fixed wing aircraft from FIG. 5.
Figure 6B:
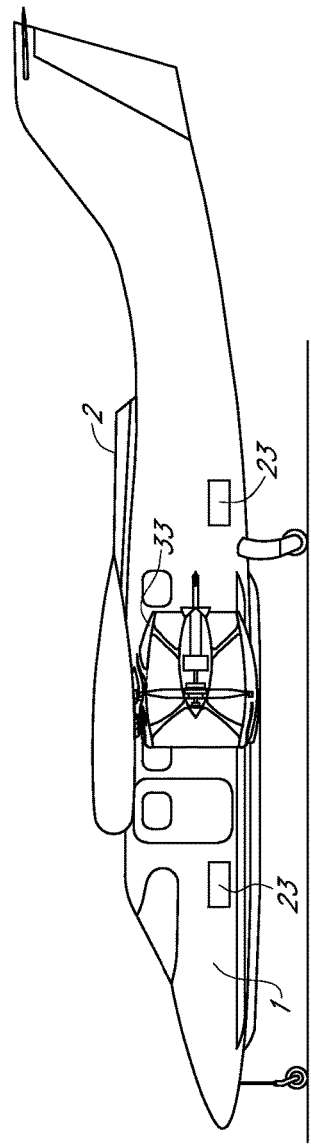
FIG. 6B illustrates an exemplary horizontal mode side view of the hybrid VTOL fixed wing aircraft from FIG. 5.

FIG. 6A illustrates an exemplary vertical mode side view of the hybrid VTOL fixed wing aircraft of FIG. 5. The fuselage 1 in this exemplary implementation includes one or more batteries 23, to store power generated by electrical generators 21, and power electric motor 22. The weight of the batteries 23 may be evenly distributed. FIG. 6B illustrates an exemplary horizontal mode side view of a hybrid VTOL fixed wing aircraft including batteries 23.

Figure 7A:
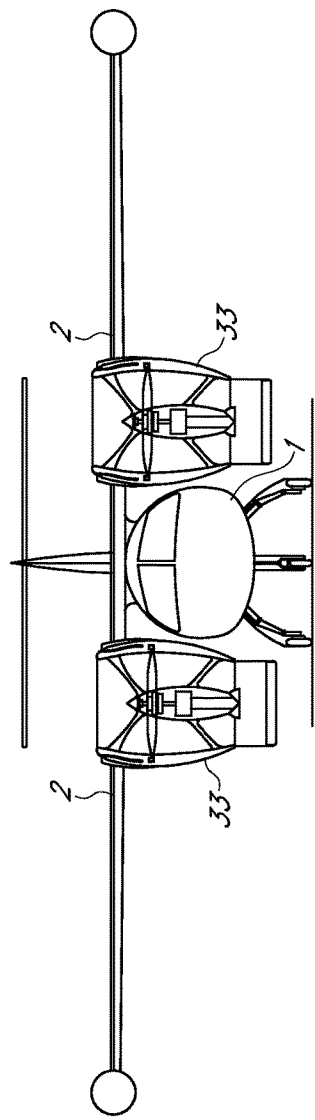
FIG. 7A illustrates an exemplary vertical mode front view of the hybrid VTOL fixed wing aircraft from FIG. 5.
Figure 7B:
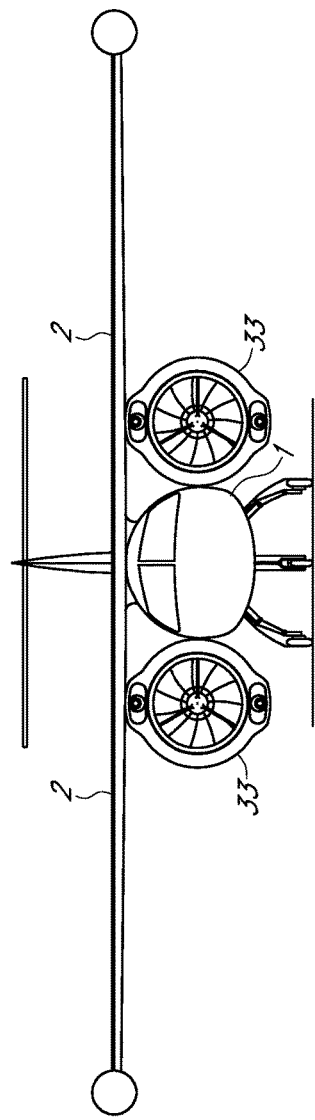
FIG. 7B illustrates an exemplary horizontal mode front view of a hybrid VTOL fixed wing aircraft from FIG. 5.

FIG. 7A illustrates an exemplary vertical mode front view of the hybrid VTOL fixed wing aircraft of FIG. 5. FIG. 7B illustrates an exemplary horizontal mode front view of the hybrid VTOL fixed wing aircraft of FIG. 5.

FIG. 8A illustrates an exemplary front view of the engine assembly 33 of the hybrid VTOL fixed wing aircraft of FIG. 5. FIG. 8B illustrates an exemplary section view of the engine assembly 33 of FIG. 8A. Electric motor 22 replaces the core cruise turbine 17 (gas generator) below the fan, directly connected to the drive fan by a shaft or through a planetary gear. At least one small gas generator 4 on the outside of the nacelle 5 energizes the tip driven fan 30 from the exhaust of the gas generator 4. The gas generator 4 runs an electric generator 21 at the bottom of the gas generator 4 and creates compressed air to energize the blowing slots 34 at the leading edge of the nacelle 5 to prevent stall, and at the fan diverter doors 15 behind the fan for unloading the fan during vertical takeoff while reducing the Q, where Q is a measure of force coming out of the back of the turbine. One or more batteries 23 in the fuselage 1 store power generated by electric generator 21 and powers the electric motor 22. The gas generators 4 on the outside of the nacelle 5 may be sized to cover the option to land the vehicle if it ran out of battery 23 power or in the event of electric motor 22 failure creating further redundancy. A benefit of this approach is that it may not be necessary to have four to six points of lift with lift propellers, and may increase the range and create an efficient VTOL hybrid.

Figure 9:
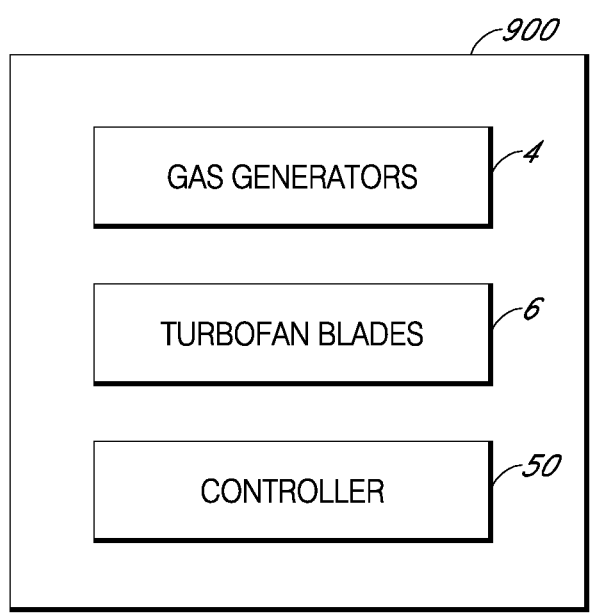
FIG. 9 is an exemplary functional block diagram of a turbofan engine of the engine assembly from one or more embodiments disclosed herein.

FIG. 9 is an exemplary functional block diagram of engine system 900 for a VTOL fixed wing aircraft. The turbofan engine includes gas generators 4, turbofan blades 6, and a controller 50. The gas generators 4, located around the rim of a central fan 30, combust fuel and exhaust gas. A plurality of turbofan blades 6 rotate around a shaft when exhaust gas impinges upon the tips of the turbofan blades to generate rotational energy. The controller 50 switches between a vertical mode and a horizontal mode, the vertical mode for aircraft takeoff, the horizontal mode for aircraft cruising.

For some implementations, the controller 50 adjusts turbofan blade 6 pitch in response to switching between the vertical mode and the horizontal mode. For some implementations, the controller 50 controls turbofan leading edge circulation by adjusting an inlet 12 size. For some implementations, the controller 50 controls turbofan exit flow circulation in response to switching between the vertical mode and the horizontal mode, including inducing a radially outward velocity component upon vertical takeoff. For some implementations, the controller 50 is configured to turn on and off each of the plurality of gas generators 4 for operation with none to all of the plurality of gas generators 4 operating.

Figure 10:
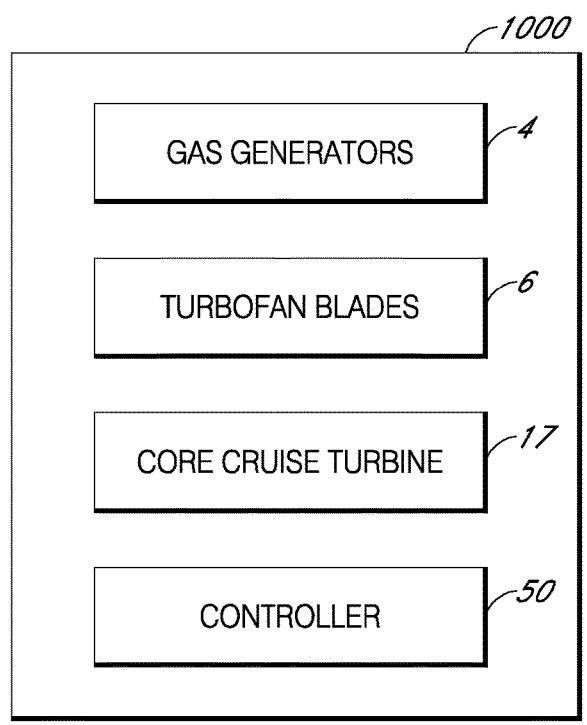
FIG. 10 is a functional block diagram of a turbofan engine that includes a core cruise turbine gas generator for use in one or more engine assemblies disclosed herein.

FIG. 10 is a functional block diagram of engine system 1000 for a VTOL fixed wing aircraft, including core cruise turbine gas generator 17, as well as gas generators 4, turbofan blades 6, and a controller 50. Core cruise turbine gas generator 17, located below the central fan 30, combusts fuel, exhausts gas, and generates fan thrust. In addition to the functions listed above with respect to FIG. 9, the controller 50 turns off at least one of the plurality of gas generators, and closes a port door 14 when the plurality of gas generators are turned off, when in cruise mode.

Figure 11:
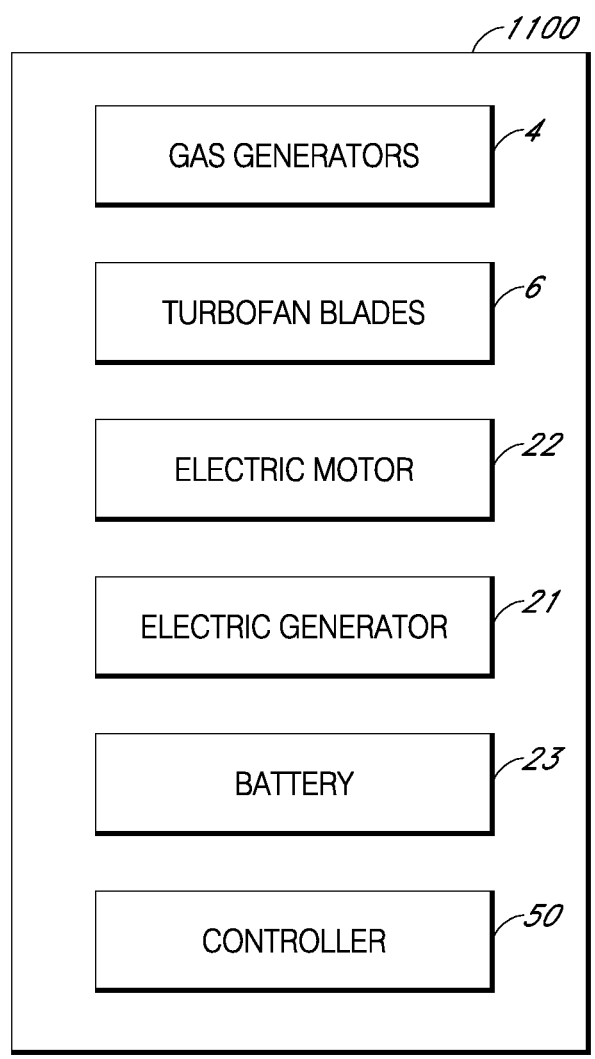
FIG. 11 is a functional block diagram of the hybrid VTOL fixed wing aircraft from FIG. 5.

FIG. 11 is a functional block diagram of engine system 1100 for a hybrid VTOL fixed wing aircraft, including an electric motor 22, electric generator 21, battery 23, as well as gas generators 4, turbofan blades 6, and a controller 50. The electric motor 22, located below the central fan, generates fan thrust. Battery 23, located in the fuselage 1, powers the electric motor 22. An electric generator, powered by one of the plurality of gas generators 4, generates electricity that charges battery 23. In addition to the functions described above with respect to FIG. 9, the controller 50 turns off at least one of the plurality of gas generators 4 and close a port door 14 when the plurality of gas generators 4 are turned off, when in cruise mode. The controller 50 manages electric power generation, battery 23 charging, supplying battery 23 power to the electric motor 22, fuel flow to each gas generator 4, and switching between electric power and gas power, in response to battery 23 power, fuel level and vehicle operations.

Controller 50 may comprise one or more processors. Controller 50 may be in a single unit, or be distributed among multiple components within the turbofan engine or aircraft. Controller 50 may be implemented in a combination of hardware, software, firmware, and electronic circuitry. Some or all of controller 50 may be integrated with other aircraft controllers, such as a full authority digital engine (or electronics) control, or an engine control unit. The controller 50 may include or interface with sensors and actuators and memory.

Figure 12:
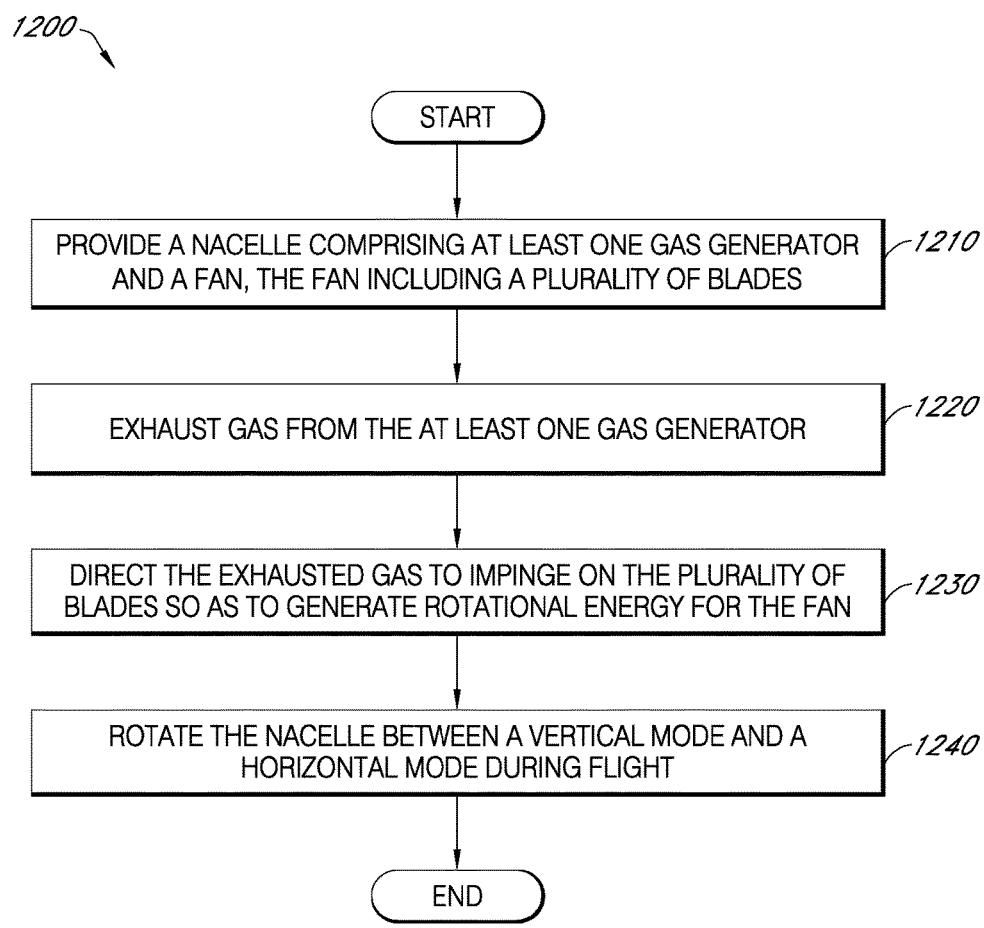
FIG. 12 is a flowchart of a method for vertical takeoff and landing for a VTOL fixed wing aircraft according to one or more embodiments disclosed herein.

FIG. 12 is a flowchart of a method 1200 for vertical takeoff, cruising, and landing for a VTOL fixed wing aircraft according to the embodiments in the disclosed technology. At block 1210, method 1200 provides a nacelle 5 comprising at least one gas generator 4 and a fan 30, the fan 30 including a plurality of blades 6. At block 1220, method 1200 exhausts gas from the at least one gas generator 4. At block 1230, method 1200 directs the exhausted gas to impinge upon the plurality of blades 6 so as to generate rotational energy. At block 1240, method 1200 rotates the nacelle 5 between a vertical mode and a horizontal mode during flight.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An engine system for vertical takeoff and landing (VTOL) aircraft comprising:
   a fan comprising a plurality of blades and having an axis of rotation, the fan providing at least horizontal thrust;
   at least one gas generator disposed relative to the plurality of blades so that exhaust gas exits from the at least one gas generator in a direction substantially parallel to the axis of rotation and that impinges on the plurality of blades to generate rotational energy;
   a nacelle, the fan and the at least one gas generator are disposed in the nacelle, the nacelle comprising an inlet for air intake, the inlet comprising a leading edge blowing slot; and
   a valve selectively allowing pressurized gas to exit the leading edge blowing slot in a forward direction towards the inlet of the nacelle, the pressurized gas exiting the leading edge blowing slot modifying flow characteristics of the fan during a vertical mode of flight.

2. The engine system of claim 1, further comprising a controller for switching the VTOL aircraft between the vertical mode and the horizontal mode, the vertical mode for aircraft takeoff, the horizontal mode for aircraft cruising.

3. The engine system of claim 1, wherein the nacelle comprises a fan duct and a first gas generator duct, the fan being disposed in the fan duct and at least one of the at least one gas generator being disposed in the first gas generator duct.

4. The engine system of claim 3, wherein the first gas generator duct is disposed at a perimeter of the fan duct.

5. The engine system of claim 4, wherein the nacelle comprises a second gas generator duct disposed on an opposite side of the fan from the first gas generator duct, and wherein at least one of the at least one gas generator is disposed in the second gas generator duct.

6. The engine system of claim 2, further comprising an actuator, the controller actuating the actuator so as to move the fan and the at least one gas generator between the vertical mode and the horizontal mode.

7. The engine system of claim 2, wherein the controller adjusts a pitch of the plurality of blades.

8. The engine system of claim 1, further comprising:
   a core cruise turbine gas generator disposed below the fan and configured to rotate the fan.

9. The engine system of claim 2, wherein the controller controls operation of the at least one gas generator.

10. The engine system of claim 1, wherein the nacelle comprises a port door, and wherein the controller closes the port door when in the horizontal mode.

11. The engine system of claim 2, further comprising an electric motor disposed below the fan for rotating the fan.

12. The engine system of claim 11, further comprising a battery and an electric generator, the battery powering the electric motor, the electric generator being powered by the at least one gas generator so as to charge the battery.

13. The engine system of claim 1, wherein the nacelle comprises an exhaust duct disposed in a flow path between the at least one gas generator and the plurality of blades to maintain momentum of the exhaust gas.

14. A method for operating a vertical takeoff and landing (VTOL) aircraft comprising:
   providing a nacelle comprising at least one gas generator and a fan, the fan including a plurality of blades and having an axis of rotation, the fan providing at least horizontal thrust, the nacelle further comprising an inlet for air intake, the inlet comprising a leading edge blowing slot;
   exhausting gas from the at least one gas generator in a direction substantially parallel to the axis of rotation and that impinges on the plurality of blades so as to generate rotational energy for the fan;
   rotating the nacelle between a vertical mode and a horizontal mode during flight; and
   selectively allowing pressurized gas to exit the leading edge blowing slot in a forward direction towards the inlet of the nacelle, the pressurized gas exiting the leading edge blowing slot modifying flow characteristics of the fan during the vertical mode of flight.

15. An engine system for vertical takeoff and landing (VTOL) aircraft comprising:

a fan rotatable about a shaft having an axis of rotation, the fan comprising a plurality of blades for providing at least horizontal thrust;

a first gas generator disposed forward of the fan so that exhaust gas exits from the first gas generator in a direction substantially parallel to the axis of rotation and impinges on the plurality of blades;

a nacelle, the fan and the at least one gas generator are disposed in the nacelle, the nacelle comprising an inlet for air intake, the inlet comprising a leading edge blowing slot; and a valve selectively allowing pressurized gas to exit the leading edge blowing slot in a forward direction towards the inlet of the nacelle, the pressurized gas exiting the leading edge blowing slot modifying flow characteristics of the fan during a vertical mode of flight.

16. The engine system of claim 15, further comprising an electric motor disposed aft of the fan to rotate the shaft.

17. The engine system of claim 15, wherein the nacelle comprises a fan duct and a gas generator duct, the fan being disposed in the fan duct and the first gas generator being disposed in the gas generator duct.

18. The method of claim 14, wherein the at least one gas generator comprises a plurality of gas generators, the method further comprising:

operating a number of the plurality of gas generators during the vertical mode during takeoff; and operating fewer than the number of the plurality of gas generators during the horizontal mode during flight.

* * * * *